United States Patent
Kong et al.

(10) Patent No.: US 8,285,482 B2
(45) Date of Patent: Oct. 9, 2012

(54) MOBILE ROBOT AND METHOD FOR MOVING MOBILE ROBOT

(75) Inventors: Dong-geon Kong, Youngin-si (KR); Hyoung-ki Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 419 days.

(21) Appl. No.: 12/656,771

(22) Filed: Feb. 16, 2010

(65) Prior Publication Data
US 2011/0137461 A1 Jun. 9, 2011

(30) Foreign Application Priority Data
Feb. 13, 2009 (KR) .................. 10-2009-0012112

(51) Int. Cl.
*G05B 19/04* (2006.01)
*G05B 19/4061* (2006.01)
(52) U.S. Cl. .................. 701/410; 700/253; 382/103
(58) Field of Classification Search .................. 701/410, 701/409, 411; 700/253, 255, 259; 382/103, 382/106, 153; 901/46
See application file for complete search history.

(56) References Cited

U.S. PATENT DOCUMENTS

| | | | |
|---|---|---|---|
| 7,916,931 B2* | 3/2011 | Lee et al. ...................... | 382/153 |
| 2007/0293985 A1 | 12/2007 | Myeong et al. | |
| 2008/0012518 A1 | 1/2008 | Yamamoto | |
| 2008/0046125 A1* | 2/2008 | Myeong et al. ............... | 700/253 |
| 2010/0070078 A1* | 3/2010 | Kong et al. ................... | 700/259 |
| 2010/0121517 A1* | 5/2010 | Lee et al. ...................... | 701/25 |
| 2010/0198443 A1* | 8/2010 | Yabushita et al. ............. | 701/25 |
| 2010/0211244 A1* | 8/2010 | Jeong et al. ................... | 701/25 |
| 2011/0137461 A1* | 6/2011 | Kong et al. ................... | 700/253 |
| 2011/0202175 A1* | 8/2011 | Romanov et al. ............. | 700/250 |
| 2011/0211731 A1* | 9/2011 | Lee et al. ...................... | 382/106 |

FOREIGN PATENT DOCUMENTS

| | | |
|---|---|---|
| JP | 2001-325023 | 11/2001 |
| JP | 2007-272301 | 10/2007 |
| KR | 10-0645814 | 11/2006 |
| KR | 10-2007-0102197 | 10/2007 |
| KR | 10-2007-0116418 | 12/2007 |
| KR | 10-2007-0120780 | 12/2007 |

* cited by examiner

*Primary Examiner* — Ronnie Mancho
(74) *Attorney, Agent, or Firm* — Staas & Halsey LLP (57) ABSTRACT

Disclosed is a mobile robot and method generating a path of the mobile robot, capable of quickly moving the mobile robot to a location at which the mobile robot is able to detect a docking station. A first configuration space map is built by expanding an obstacle area including an obstacle by a first thickness, and a second configuration space map is built by expanding the obstacle area by a second thickness which is less than the first thickness. A path is generated by sequentially using the first configuration space map and the second configuration space map.

16 Claims, 6 Drawing Sheets

MOBILE ROBOT AND METHOD FOR MOVING MOBILE ROBOT

CROSS-REFERENCE TO RELATED APPLICATIONS

This application claims the benefit under 35 U.S.C. §119(a) of Korean Patent Application No. 10-2009-0012112, filed on Feb. 13, 2009, the disclosure of which is incorporated by reference in its entirety for all purposes.

BACKGROUND

1. Field

One or more embodiments relate to a mobile robot, and more particularly, to a mobile robot and method generating/following a path for moving of the mobile robot.

2. Description of the Related Art

In general, a mobile robot typically needs to return to a docking station for power charging and self position correction. When the mobile robot reaches the docking station, the mobile robot first recognizes the position of the docking station and returns to the docking station by use of the recognized position.

The mobile robot may recognize the position of the docking station through infrared communication, radiofrequency communication, ultrasonic communication or image recognition using a camera. However, in the case that the docking station is far from the mobile robot, the above localizing schemes are not always effective, such that the mobile robot may fail to return to the docking station. Accordingly, if the mobile robot is disposed at a location in which signal reception from the docking station is unavailable, the mobile robot first needs to move to a reception area.

SUMMARY

Accordingly, to one or more embodiments, there is provided an apparatus and method for generating a path of a mobile robot, capable of quickly moving the mobile robot to a location at which the mobile robot is able to detect a docking station.

In one or more embodiments, there is provided a mobile robot including a controlling unit, an obstacle map building unit, a path generating unit, and a moving unit. The controlling unit estimates a position of the mobile robot by use of detection information. The obstacle map building unit builds an obstacle map indicating an obstacle area including an obstacle based on the estimated position and obstacle detection information. The path generating unit expands the obstacle area by a first thickness to build a first configuration space map, expands the obstacle area by a second thickness which is less than the first thickness to build a second configuration space map, and generates a path by sequentially using the first configuration space map and the second configuration space map. The moving unit to move the mobile robot along the path.

When the path generating unit is no longer able to generate a path in the first configuration space map, the path generating unit generates a path in the second configuration map. The path generating unit recognizes that the path generating unit is no longer able to generate a path when a goal point is not present.

The first thickness has a dimension identical to a width of a passage used to divide an area of the obstacle map, which allows the movement of the mobile robot, into at least two distinguishable areas.

After the mobile robot has moved along a path generated in the second configuration space map, when the path generating unit searches for a next goal point to generate a next path, the path generating unit determines whether a boundary between an unknown area including the next goal point and an empty area lacking an obstacle has a width exceeding a predetermined width, and, when the width of the boundary exceeds the predetermined width, the mobile robot builds a first configuration space map at a current position of the mobile robot and generates the next path based on the generated first configuration space map.

The control unit detects a guidance signal from a docking station and controls the path generating unit to generate a path based on the guidance signal.

In one or more embodiments, there is provided a method of moving a mobile robot. An obstacle map indicating an obstacle area including an obstacle is built by use of an estimated position of the mobile robot and obstacle detection information. A first configuration space map is built by expanding the obstacle area by a first width. A second configuration space map is built by expanding the obstacle area by a second width which is less than the first width. A path is generated by sequentially using the first configuration space map and the second configuration space map, and the mobile robot moves along the path Other features will become apparent to those skilled in the art from the following detailed description, which, taken in conjunction with the attached drawings, discloses one or more embodiments of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
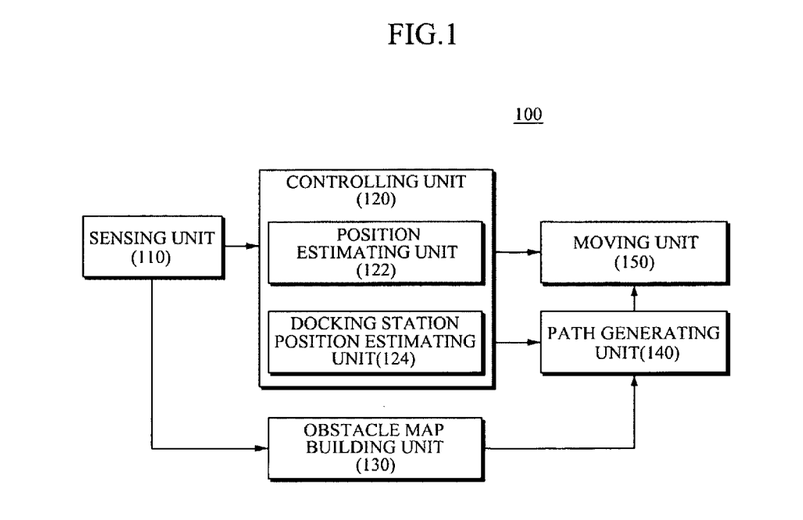
FIG. 1 is a block diagram showing a mobile robot, according to one or more embodiments.

FIG. 1 is a block diagram showing a mobile robot, according to one or more embodiments.

A mobile robot 100 includes a sensing unit 110, a controlling unit 120, an obstacle map building unit 130, a path generating unit 140 and a moving unit 150.

The sensing unit 110 senses the amount of movement and the rotation of the mobile robot 100, thereby estimating a current position of the mobile robot 100. The sensing unit 115 may include an encoder or a gyro sensor. For example, the displacement and moving direction of the mobile robot 100 are integrated by an encoder, so that the current position and orientation angle, that is, the pose of the mobile robot 100 are estimated in the cartesian coordinate system.

In addition, the sensing unit 110 may include an infrared sensor, a laser sensor or an ultrasonic sensor to detect a distance between the mobile robot 100 and an obstacle. In addition, the sensing unit 110 may sense a docking guidance signal transmitted from a docking station (not shown), for example, infrared signals, radio frequency signals or ultrasonic signals.

The controlling unit 120 controls transmission/reception of data among components of the mobile robot 100, thereby controlling an overall operation of the mobile robot 100. The controlling unit 120 may include a position estimating unit 122 and a docking station position estimating unit 124. The position estimating unit 122 estimates the position of the mobile robot 100 by use of sensed information.

The docking station position estimating unit 124 senses a guidance signal transmitted from a docking station (not shown), calculates the position of the docking station based on the sensed signal and controls the path generating unit 140 such that a path leading to the docking station is generated. For example, the docking station position estimating unit 124 detects the level and direction of sensed signals to determine a positional relationship between the mobile robot 100 and the docking station, and controls the path generating unit 140 to generate a set path desirably toward the docking station according to a correspondingly set goal point.

The obstacle map building unit 130 generates an obstacle map by calculating a distance between the mobile robot 100 and an obstacle using obstacle sensing information sensed by the sensing unit 110. In general, the obstacle map is formed as a grid map in which areas divided in the form of a grid correspond to the surroundings of the mobile robot to represent the possibility that an object is present in respective areas statistically. The obstacle map building unit 130 may build an obstacle map by use of position information estimated by the controlling unit 120 and values sensed by an obstacle sensing sensor included in the sensing unit 110.

The path generating unit 140 generates a return path allowing the mobile robot to quickly travel to an area in which the mobile robot 100 can transmit a signal to a docking station and receive a signal from the docking station. A return path represents a plurality of paths which are searched through at least one step performed to reach a docking station. The return path may be generated through various methods.

Figure 3:
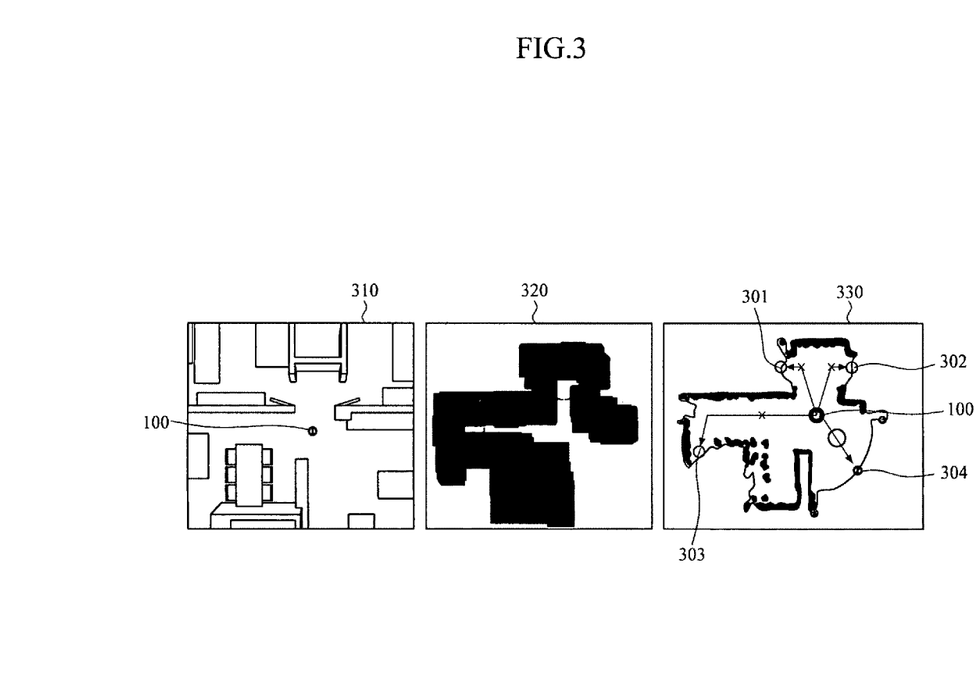
FIG. 3 is a view showing a space having a mobile robot, a first configuration space map, and a process of generating a path in the first configuration space map, according to one or more embodiments.

The path generating unit 140 sets a candidate goal point based on the obstacle map. When setting the candidate goal point based on the obstacle map, the candidate goal point may represent a point provided on at least one boundary between an unknown area of the obstacle map and an area of the obstacle map lacking an obstacle. FIG. 3 illustrates an example of candidate goal points 301, 302, 303, and 304 at between an obstacle-free area of the obstacle map 330 and an unknown area beyond these points. As shown in space 310 of FIG. 3, the extent of which may be unknown to the mobile robot, the unknown areas beyond points 301, 302, and 303 would appear to be corridors while the unknown area beyond point 304 would appear to be a passage to another area.

The path generating unit 140 defines a configuration space map in consideration of the size of the mobile robot 100, in which the mobile robot 100 is assumed as a reduced point and the size of a boundary or an obstacle is increased in consideration of the size of the mobile robot 100 to form a free area allowing the robot to move freely. The path generating unit 140 selects a reachable goal point for the mobile robot 100 from the candidate goal points by use of the free space of the configuration space map, thereby generating a path to the goal point. If a plurality of reachable goal points are present, one of the reachable goal points may be determined to be a final goal point. As an example, a reachable point closest to the current position of the mobile robot 100 may be determined to be the final goal point. The path generating unit 140 may generate a path leading to the final goal point while bypassing any obstacles included in the configuration space map.

That is, the path generating unit 140 may obtain candidate goal points provided at boundaries between an unknown area and an empty area lacking an obstacle based on the obstacle map, and determine, as a final goal point, one of the candidate goal points capable of generating paths based on the configuration space map. The path generating unit 140 may generate a path by use of the A-star algorithm known as an example of best-first search.

Even while a path is being generated or while the mobile robot 100 is travelling along a path, if the controlling unit 120 detects a signal from the docking station, the controlling unit 120 may control the path generating unit 140 to generate a path according to the detected signal.

The moving unit 150 may include a mobility member enabling mobility (hereinafter "mobility member"), such as a plurality of wheels, to move the mobile robot 100, a driving source of providing driving force to the mobility member, and a control member which controls the mobility member to move the mobile robot 100 along the set path.

Hereinafter, the following description will be made in relation to the mobile robot 100 which generates a path and moves along the path.

The mobile robot 100 detects the surrounding environment to determine an obstacle area, an empty area lacking any obstacles, and an unknown area. The mobile robot 100 determines whether a first boundary point is present at a first boundary, which is selected from boundaries between the unknown area and the empty area and has a width larger than a predetermined width. The first boundary point represents a point provided in the first boundary, which is capable of being used to form a path among the candidate goal points described above. If the first boundary point exists, the mobile robot 100 moves to the first boundary point. If the first boundary point does not exist, the mobile robot 100 moves to a second boundary point provided at a second boundary having a width smaller than the predetermined width. If a plurality of first boundary points and second boundary points exist, the mobile robot 100 may set at least one goal point through various methods and move along a path leading to the set goal point.

Hereinafter, the process of the mobile robot generating a path will be described in detail with reference to FIGS. 1 and 2.

Figure 2:
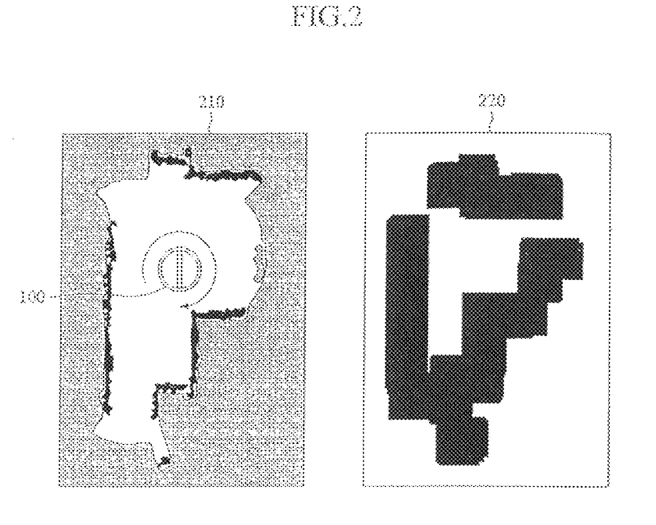
FIG. 2 is a view showing an example of an obstacle map and a configuration space map, according to one or more embodiments.

FIG. 2 is a view showing an example of an obstacle map and a configuration space map, according to one or more embodiments.

As shown in FIG. 2, a general obstacle map 210 serves to illustrate the surface of a wall or obstacles and to indicate a free area. In the obstacle map 210, the black portion represents an obstacle, the white portion represents an area lacking an obstacle, and the gray portion represents an unknown area which is not formed by the mobile robot 100.

The obstacle map 210 is built regardless of the size of the mobile robot 100, such that the mobile robot 100 may collide with an obstacle during movement. However, a configuration space map 220 is defined in consideration of the size of the mobile robot 100, in which the robot is regarded as a reduced point and the surface of a wall or the obstacle is expanded in consideration of the size of the robot. Accordingly, a free area allowing the robot to move without limitation is generated.

First, the path generating unit 140 builds a first configuration space map by expanding an obstacle area of an obstacle map including an obstacle by a first thickness. The expanding of the obstacle area may mean an eroding of the free area. After that, the path generating unit 140 builds a second configuration space map by expanding the obstacle area by a second thickness less than the first thickness. The path generating unit 140 may generate a path by sequentially using the first configuration space map and the second configuration space map.

If the path generating unit 140 is no longer able to generate a path in the first configuration space map, the path generating unit 140 may generate a path in the second configuration space map. The path generating unit 140 determines a situation, in which a path is no longer generated, to mean that a goal point does not exist. The first thickness may have a dimension identical to a width of a passage which divides an area allowing the movement of the mobile robot into at least two distinguishable, or separated, areas. The passage may have the same width as that of a door. The width of the passage or the door may be preset or may be set by a user. The second thickness may be identical to the radius of the mobile robot.

That is, the mobile robot 100 generates a path in the first configuration space map and moves along the path, and thus the mobile robot 100 may roughly search an area where the mobile robot 100 exists. In this process, if the mobile robot 100 fails to detect a docking station, the mobile robot 100 sets a path based on the second configuration space map which is generated by expanding the obstacle area of the grid map 210 by the second thickness which is less than the first thickness. As a result, the mobile robot 100 is capable of discovering an exit which is blocked in the first configuration space map and escapes from one space included in the first configuration space map to another space. In addition, the path searching based on the second configuration space map offers increased accuracy over the first configuration space map.

After the path generating unit 140 has moved along the path generated based on the second configuration space map, the path generating unit 140 searches for a next goal point to generate a next path. In this case, the mobile robot 100 determines whether a boundary between an unknown area including the next goal point and an empty area lacking an obstacle in the obstacle map has a width exceeding a predetermined width or a critical width. The predetermined width may be set depending on the total size of an area allowing the movement of the mobile robot 100 and the configuration of the area. For example, the predetermined width may be equal to the width of a passage. Upon the determination result, the path generating unit 140 may determine whether to generate a path by generating a first configuration space map or to generate a path by generating a second configuration space map based on the current position of the mobile robot 100 in the obstacle map.

When the mobile robot 100, which has completed moving along a path generated by use of a second configuration space map, generates a next path, if a boundary including a goal point has a width exceeding the predetermined width, the mobile robot 100 may build a first configuration space map and generate a path based on the first configuration space map. The fact that the width of the boundary including the goal point exceeds the predetermined width is taken to mean that the mobile robot 100 has moved to a more spacious area. Accordingly, it is efficient for the mobile robot 100 to search an area with a wider view by generating a path based on the first configuration space map.

As described above, the mobile robot 100 builds an obstacle map by itself to quickly move to an area enabling signal transmission/reception with a docking station. In addition, after the mobile robot 100 has moved based on the first configuration space map, if the mobile robot 100 fails to detect the docking station, the mobile robot 100 builds a second configuration space map and generates a path so that the mobile robot 100 may escape from the current space to the next space. In the case that a docking station is disposed in a space, such as a living room, surrounded by a plurality of spaces, the method of searching a path of a mobile robot offers increased efficiency over the general wall following algorithm, in which a mobile robot moves along the surface of a wall.

FIG. 3 is a view showing a space having a mobile robot, a first configuration space map and a process of generating a path based on the first configuration space map, according to one or more embodiments.

In FIG. 3, a space 310 having a mobile robot 100, a first configuration space map 320 and an obstacle map 330 are shown. Goal points set by directly using the obstacle map 330 may include candidate goal points 301, 302, 303 and 304.

The mobile robot 100 builds the first configuration space map 320 by expanding an obstacle area of the obstacle map 330 by an amount suitable for dividing an area. For example, the path generating unit 140 builds the first configuration space map 320 by expanding the obstacle area of the obstacle map 330 by the width of a door and generates a path by use of the first configuration space map 320.

The first thickness may be preset by a user. Alternatively, the first thickness may be the very minimum width of the obstacle area which causes one space to be separated from another space due to the increase of the obstacle area.

As shown in FIG. 3, since areas corresponding to the candidate goal points 301, 302 and 303 in the obstacle map 330 are represented as closed obstacle areas in the first configuration space map 320, paths leading to the candidate goal points 301, 302 and 303 are not generated. A path leading to the goal point 304 disposed in an open area is generated in the first configuration space map 320. As described above, if a path is generated by use of the first configuration space map 320, the mobile robot 100 is prevented from unintentionally passing through a door or a narrow passage. Accordingly, the mobile robot 100 may effectively detect the presence of the docking station in the current space.

Figure 4:
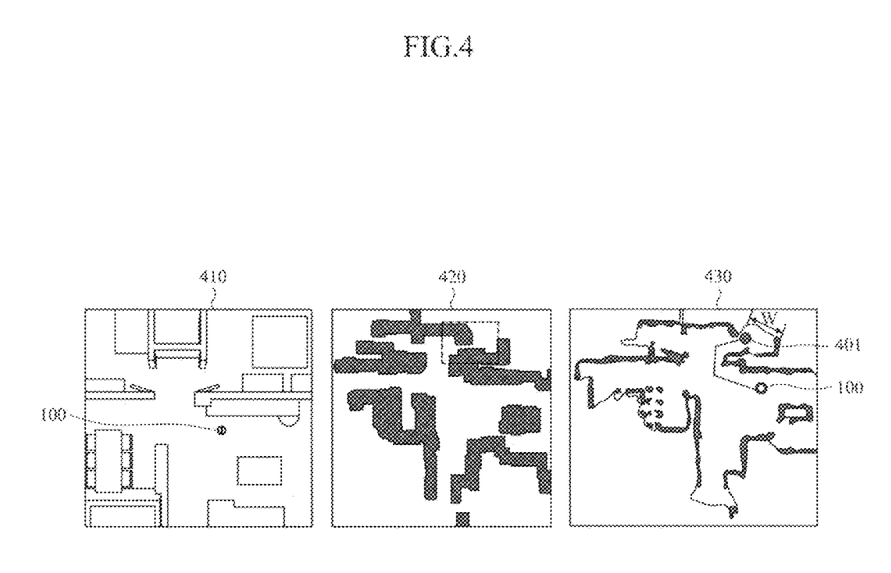
FIG. 4 is a view showing a space having a mobile robot, a second configuration space map, and a process of generating a path in the second configuration space map, according to one or more embodiments.

FIG. 4 is a view showing a space having a mobile robot, a second configuration space map and a process of generating a path based on the second configuration space map, according to one or more embodiments.

As shown in FIG. 4, a space 410 having the mobile robot 100, a second configuration space map 420 and an obstacle map 430 are provided. W represents the width of a boundary including a goal point.

When investigating a free area, if the mobile robot 100 fails to detect a docking station and fails to generate a path in the first configuration space map 320, the mobile robot 100 generates a second configuration map 420 in consideration of the size of the mobile robot 100.

After that, the path generating unit 140 generates a path by use of the second configuration space map 420 and searches for the docking station while moving along the generated path. In this case, the mobile robot 100 sets a predetermined point, which would be unallowable as a goal point in the first configuration space map 310, as a goal point 401 and moves to the goal point 401, thereby escaping from the previous space.

Figure 5:
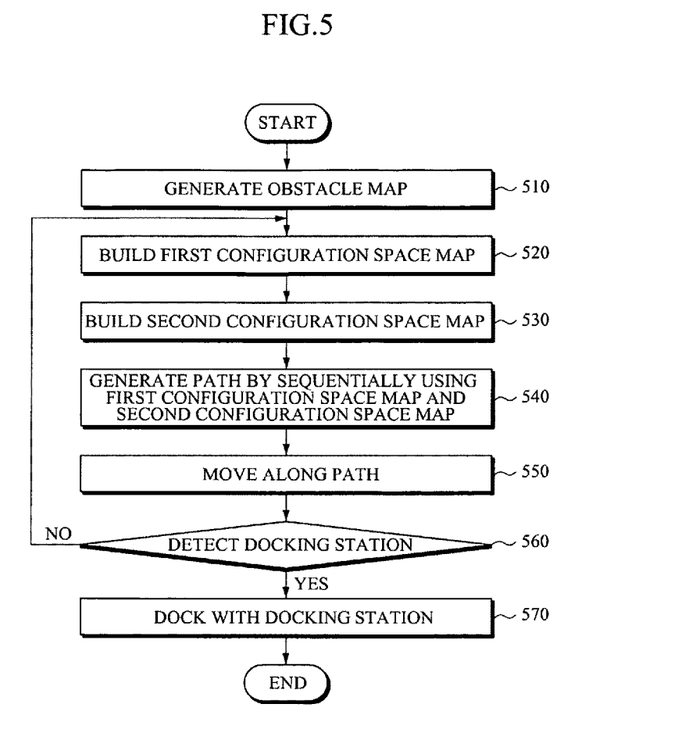
FIG. 5 is a flowchart showing a method of moving a mobile robot, according to one or more embodiments.

FIG. 5 is a flowchart showing a method of moving a mobile robot, according to one or more embodiments.

The mobile robot generates an obstacle map by use of the estimated position of the mobile robot and obstacle sensing information (operation 510). In this case, the generating of an obstacle map represents an interim process to complete the generating of an obstacle map. As shown in FIG. 5, the obstacle map is generated by use of obstacle sensing information sensed at the current position of the mobile robot.

The mobile robot builds a first configuration space map by expanding an obstacle area having an obstacle in the obstacle map by a first thickness (operation 520). The first thickness may have a dimension identical to a width of a passage which divides an area allowing the movement of the mobile robot into at least two areas. The passage may have the same width as a width of a door of the area allowing the movement of the mobile robot.

The mobile robot builds a second configuration space map by expanding an obstacle area by a second thickness which is less than the first thickness (operation 530). The second thickness has a dimension identical to the radius of the mobile robot.

The mobile robot generates a path by sequentially using the first configuration space map and the second configuration space map (operation 540), and moves along the path (operation 550).

If the mobile robot detects a docking station based on docking guidance signals transmitted from the docking station (operation 560), the mobile robot moves to dock with the docking station (operation 570). As shown in FIG. 5, if the mobile robot does not detect a docking station (operation 560), the mobile robot may return to the procedure of building a first configuration space map.

The processes shown in FIG. 5 do not need to be sequentially performed. For example, the generating of a path based on the first configuration map may be performed between operation 520 and operation 530. In addition, the attempt to detect, or detecting, of a docking station may be performed in any of the processes shown in FIG. 5.

If the mobile robot moves to an area in which docking signal transmission/reception with a docking station is obtained, the mobile robot recognizes the position of the docking station by use of the guidance signals, and docks with the docking station.

Figure 6:
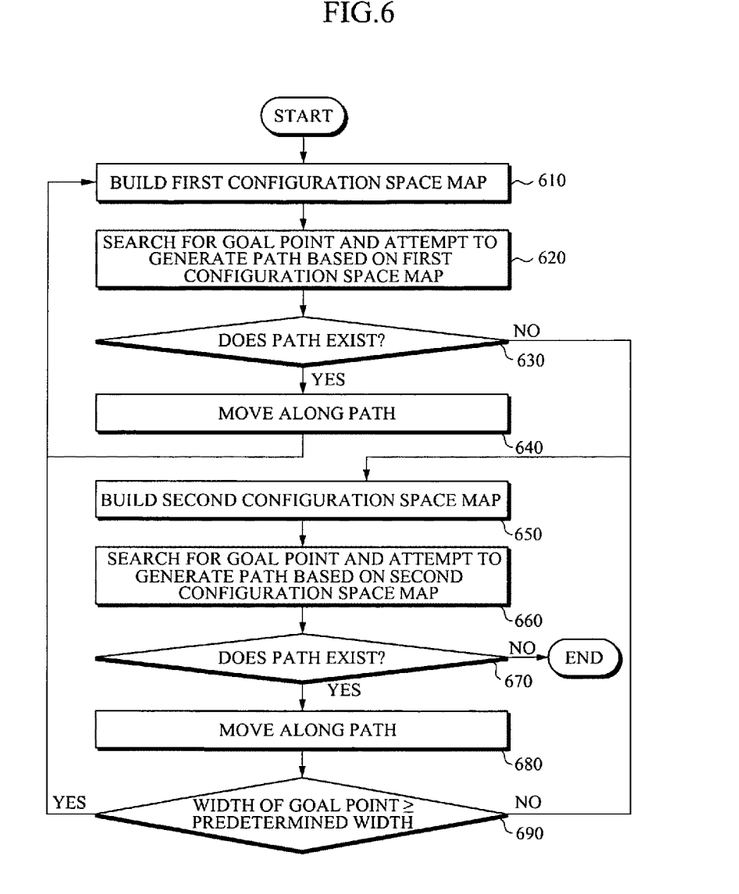
FIG. 6 is a flowchart showing a method of generating a path of a mobile robot, according to one or more embodiments.

FIG. 6 is a flowchart showing a method of generating a path of a mobile robot, according to one or more embodiments.

The mobile robot builds a first configuration space map by expanding an obstacle area having an obstacle in an obstacle map by a first thickness (operation 610). After that, the mobile robot searches for a goal point and attempts to generate a path based on the first configuration space map (operation 620). If a reachable goal point of the mobile robot is present and the presence of a path allowing the mobile robot to move to the reachable goal point is confirmed (operation 630), the mobile robot moves along the path (operation 640).

Operations 610 to 640 represent processes of searching a current space which is distinguishable from another space in the first configuration space map.

If a goal point does not exist and the generating of a path is not possible (operation 630), the mobile robot needs to escape from the current space.

To this end, the mobile robot builds a second configuration space map by expanding an obstacle area having an obstacle in the obstacle map by a second thickness which is less than the first thickness (operation 650).

After that, the mobile robot searches for a goal point and attempts to generate a path based on the second configuration space map (operation 660). If a reachable goal point of the mobile robot is present and the presence of a path allowing the mobile robot to move to the reachable goal point is confirmed (operation 670), the mobile robot moves along the path (operation 680). If the presence of a path allowing the movement of the mobile robot is not confirmed (operation 670), the generating of a path is terminated.

The mobile robot sets a next goal point based on the second configuration space map where the mobile robot has completed moving, and it is determined whether the width of a boundary including the next goal point exceeds a predetermined width (operation 690). If the width of the boundary exceeds the predetermined width, the mobile robot returns to operation 610 in which a first configuration space map is built and a path is generated based on the first configuration space map. If the width of the boundary including the next goal point is below the predetermined width (operation 690), the mobile robot returns to operation 650 in which a second configuration space map is built and a path is generated based on the second configuration space map.

According to one or more embodiments, with a method of moving a mobile robot, even if a map of a space is not given, the mobile robot quickly moves to an area in which signal transmission/reception with a docking station is enabled through building an obstacle map by itself.

One or more embodiments can also be embodied as computer readable media encoded with computer readable code to control at least one processing device to implement one or more of the aforementioned embodiments, for example. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices. The computer readable recording medium can also be a distributed network coupled computer system so that the computer readable code is stored and executed in a distributed fashion.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, while aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A mobile robot comprising:
   a controlling unit to estimate a position of the mobile robot by use of detection information;
   an obstacle map building unit to build an obstacle map indicating an obstacle area including an obstacle based on the estimated position and obstacle detection information;
   a path generating unit to expand the obstacle area by a first thickness to build a first configuration space map, expand the obstacle area by a second thickness which is less than the first thickness to build a second configuration space map, and to generate a path by sequentially using the first configuration space map and the second configuration space map; and
   a moving unit to move the mobile robot along the path.

2. The mobile robot of claim 1, wherein, when the path generating unit is no longer able to generate a path in the first configuration space map, the path generating unit generates a path in the second configuration map.

3. The mobile robot of claim 2, wherein, the path generating unit recognizes that the path generating unit is no longer able to generate the path when a goal point is not present.

4. The mobile robot of claim 1, wherein, the first thickness has a dimension identical to a width of a passage used to divide an area of the obstacle area, which allows movement of the mobile robot, into at least two distinguishable areas.

5. The mobile robot of claim 1, wherein the second thickness has a dimension identical to a radius of the mobile robot.

6. The mobile robot of claim 1, wherein, after the mobile robot has moved along a path generated in the second configuration space map, when the path generating unit searches for a next goal point to generate a next path,
   the path generating unit determines whether a boundary, between an unknown area including the next goal point and an empty area lacking an obstacle, has a width exceeding a predetermined width, and, when the width of the boundary exceeds the predetermined width, the mobile robot builds a first configuration space map at a current position of the mobile robot and generates the next path based on the generated first configuration space map.

7. The mobile robot of claim 1, wherein the controlling unit detects a guidance signal from a docking station and controls the path generating unit to generate a path based on the guidance signal.

8. A method of moving a mobile robot, the method comprising:
   building an obstacle map indicating an obstacle area including an obstacle by use of an estimated position of the mobile robot and obstacle detection information;
   building a first configuration space map by expanding the obstacle area by a first width;
   building a second configuration space map by expanding the obstacle area by a second width which is less than the first width; and
   generating a path by sequentially using the first configuration space map and the second configuration space map so that the mobile robot moves along the path.

9. The method of claim 8, wherein the generating of the path comprises:
   generating a path in the first configuration space map; and
   when the path is no longer able to be generated in the first configuration space map, generating a path in the second configuration space map.

10. The method of claim 9, further comprising determining whether a goal point is present in the first configuration space; and
    recognizing that the path is no longer able to be generated in the first configuration space when the goal point is not present.

11. The method of claim 8, wherein the first thickness has a dimension identical to a width of a passage which is used to divide an area of the obstacle area, allowing movement of the mobile robot, into at least two distinguishable areas.

12. The method of claim 11, wherein the passage has a same width as a width of a door installed in the passage.

13. The method of claim 8, wherein the second thickness has a dimension identical to a radius of the mobile robot.

14. The method of claim 8, wherein the generating of a path further comprises: after the mobile robot has moved in a path generated in the second configuration space map, when searching for a next goal point to generate a next path, determining whether a boundary, between an unknown area including the next goal point and an empty area lacking an obstacle, has a width exceeding a predetermined width, and when the width of the boundary exceeds the predetermined width, building a first configuration space map at a current position of the mobile robot and generating the next path based on the generated first configuration space map.

15. The method of claim 8, further comprising when the mobile robot detects a signal from a docking station during movement, generating a path based on the detected signal.

16. A method of moving a mobile robot, the method comprising:
    detecting an area around the mobile robot;
    determining a presence of a first boundary point present at a first boundary in the area around the mobile robot, which is selected from boundaries between an unknown area determined by detecting the area around the mobile robot and an empty area around the mobile robot lacking an obstacle and has a width larger than a predetermined width;
    when the first boundary point is present, moving the mobile robot to the first boundary point; and
    when the first boundary point is not present, moving to a second boundary point present at a second boundary which is selected from the boundaries and has a width smaller than the predetermined width.

* * * * *